United States Patent
Graff et al.

(10) Patent No.: US 12,015,875 B2
(45) Date of Patent: Jun. 18, 2024

(54) METHOD AND SYSTEM FOR REAL TIME AUDIO IN MULTI-POINT VIDEO CONFERENCING

(71) Applicant: Pexip AS, Oslo (NO)

(72) Inventors: Håvard Graff, Oslo (NO); Tulio Beloqui, Oslo (NO)

(73) Assignee: Pexip AS, Oslo (NO)

( * ) Notice: Subject to any disclaimer, the term of this patent is extended or adjusted under 35 U.S.C. 154(b) by 365 days.

(21) Appl. No.: 17/551,339

(22) Filed: Dec. 15, 2021

(65) Prior Publication Data
US 2022/0201252 A1    Jun. 23, 2022

(30) Foreign Application Priority Data
Dec. 18, 2020 (NO) .................................... 20201393

(51) Int. Cl.
| | | |
|---|---|---|
| H04N 7/15 | (2006.01) | |
| G10L 19/00 | (2013.01) | |
| H04L 12/18 | (2006.01) | |
| H04L 65/65 | (2022.01) | |
| H04L 65/70 | (2022.01) | |

(52) U.S. Cl.
CPC .......... *H04N 7/152* (2013.01); *G10L 19/0017* (2013.01); *H04L 12/1827* (2013.01); *H04L 65/65* (2022.05); *H04L 65/70* (2022.05)

(58) Field of Classification Search
CPC .......... H04N 7/152; H04L 65/70; H04L 65/65
See application file for complete search history.

(56) References Cited

U.S. PATENT DOCUMENTS

| | | | | |
|---|---|---|---|---|
| 6,470,051 B1 * | 10/2002 | Campisano | ............ | H04N 19/44 375/E7.212 |
| 2003/0009325 A1 * | 1/2003 | Kirchherr | ............... | G10L 19/20 704/E19.041 |

(Continued)

FOREIGN PATENT DOCUMENTS

| | | |
|---|---|---|
| WO | 0215556 A2 | 2/2002 |
| WO | 2007111842 A2 | 10/2007 |

(Continued)

OTHER PUBLICATIONS

Norwegian Search Report dated Jul. 13, 2021, for corresponding Norwegian Application No. 20201393; consisting of 3-pages.

(Continued)

*Primary Examiner* — Amal S Zenati
(74) *Attorney, Agent, or Firm* — Leech Tishman Fuscaldo & Lampl

(57) ABSTRACT

A real time audio multi-point videoconferencing system comprising at least two videoconferencing endpoints in communication with a multipoint control unit, and a method of providing the real time audio. The method comprising capturing input lossless digital audio streams on each of the at least two videoconferencing endpoints, transmitting the input lossless digital audio streams from each of the at least two videoconferencing endpoints to the MCU using a frame size in the range 0.25 ms-3 ms, mixing, using the MCU, the input lossless digital audio streams into a plurality of output lossless digital audio streams, transmitting a different one of the plurality of output lossless digital audio streams to each of the at least two videoconferencing endpoints using a frame size in the range 0.25 ms-3 ms, and playback the plurality of output lossless digital audio streams on each of the at least two videoconferencing endpoints.

16 Claims, 2 Drawing Sheets

(56) References Cited

U.S. PATENT DOCUMENTS

| | | | | |
|---|---|---|---|---|
| 2010/0278291 A1* | 11/2010 | Bugenhagen | ......... | H04J 3/0632 |
| | | | | 375/354 |
| 2012/0236111 A1* | 9/2012 | Halavy | .................. | H04N 7/152 |
| | | | | 348/14.09 |
| 2015/0371654 A1* | 12/2015 | Johnston | ............. | G10L 21/0208 |
| | | | | 381/66 |
| 2018/0234471 A1* | 8/2018 | Qian | ................... | H04L 61/2564 |

FOREIGN PATENT DOCUMENTS

| | | |
|---|---|---|
| WO | 2008080426 A1 | 7/2008 |
| WO | 2019038019 A1 | 2/2019 |
| WO | 2020231577 A1 | 11/2020 |

OTHER PUBLICATIONS

Wardrobe, K., Guide to Zoom Audio Settings for Music Teachers, Sep. 2020, Zoom version 5.2.2, Midnight Music; consisting of 12-pages.
Zhu, Q. et al., Low-Delay, Low-Complexity Rate Reduction and Continuous Presence for Multipoint Videoconferencing, IEE Transactions on Circuits and Systems for Video Technology, vol. 9, No. 4, Jun. 1999, pp. 666-676; consisting of 11-pages.
International-Type Search Report dated Aug. 9, 2021, for corresponding Norwegian Application No. 20201393; consisting of 5-pages.
Gu, X. et al., Network-centric Music Performance: Practice and Experiments, IEE Communications Magazine, Jun. 2005, pp. 86-93; consisting of 8-pages.

* cited by examiner

METHOD AND SYSTEM FOR REAL TIME AUDIO IN MULTI-POINT VIDEO CONFERENCING

CROSS-REFERENCE TO RELATED APPLICATION

This application is related to and claims priority to Norwegian Patent Application No. 20201393 filed Dec. 18, 2020, entitled METHOD AND SYSTEM FOR REAL TIME AUDIO IN MULTI-POINT VIDEO CONFERENCING, the entirety of which is incorporated herein by reference.

FIELD

The present invention relates to providing real time audio in multi-point videoconferencing.

BACKGROUND

Transmission of audio is an integral part of video conferencing, net meetings and videotelephony. Participants in video conferences, particularly when there are many participants in a conference, often experiences that the conversation does not flow as natural as in a physical meeting room and that they unwillingly interrupt each other by speaking simultaneously. The core of this problem is that sound uses more time to travel across the internet than most people would expect.

In a normal conversation in a meeting room, those speaking would typically be less than 5 meters apart, which means that the sound delay, or latency, is around 15 milliseconds (ms) as sound travels roughly 1 meter in 3 ms. This latency is perceived by the human brain will as instantaneous. In video conferencing it is common to experience latencies up to 500 ms. This is the equivalent of two people yelling at each other 160 meters apart. Even at best-case scenarios with available technologies today, the latency is still around 200 ms, which is over 60 meters. While it is difficult to keep a natural conversation going with a latency of 200 ms or more, playing music together is near impossible.

In order to be able to play together in sync, to feel a common rhythm or pulse, the latency needs to be very low. In terms of distance, most musicians would agree that being more than 10 meters apart makes it very hard to play together. This means that anything more than 30 ms of latency is going to make it hard to play synchronized with a common pulse. Additionally, a comfortable experience for musicians requires clean, high-quality sound with no nose, clicks or pops, while the latency is low.

In video conferencing system audio is captured at videoconferencing endpoints using a microphone and an analog-to-digital converter that converts the analog signal into a digital uncompressed audio signal, such as Pulse-code modulation (PCM). The digital uncompressed audio signal is split in frames of 20 ms and sent to an audio codec that compress the data to reduce transmission bandwidth. Video conferencing audio codecs performs lossy compression, that is, the audio codecs reduce the audio quality in order to maximize compression.

Transmitting the digital uncompressed audio signal in frames of 20 ms introduces a delay, or latency, in the system of 20 ms. In addition, in order to make sure the codec has sufficient digital uncompressed audio frames to work on to avoid glitches in the sound, the codec keeps a three frame buffer. The three frame buffer adds a latency of 40-60 ms, Additionally, even the fastest codecs adds an algorithmic delay of at least 3-7 ms. At this stage, we already reached a total latency from one point to another that exceeds the required real time audio latency for playing music together.

FIG. 1 schematically illustrates multi-point videoconferencing system 100 with three videoconferencing endpoints 101a, 101b, 101c in communication with a multipoint control unit (MCU) 104. In the multi-point videoconferencing system 100 all media passes through the MCU 104. Input audio 102a, 102b, 102c captured at the videoconferencing endpoints 101a, 101b, 101c is transmitted to the MCU 104, then the input audio 102a, 102b, 102c is mixed with audio from the other videoconferencing endpoints 101a, 101b, 101c, and output audio 103a, 103b, 103c is transmitted back out to the videoconferencing endpoints 101a, 101b, 101c. Now, the end to end latency from one videoconferencing endpoint to another videoconferencing endpoint is approximately 200 ms.

In addition, in order to avoid echo in the videoconference, the videoconferencing systems comprises an echo cancellation algorithm that adds from 60 ms—several hundred ms of latency depending on the acoustics at the site of a videoconference endpoint.

Therefore, there is a need for a method and system that reduces audio latency without compromising audio quality.

SUMMARY

In view of the above, an object of the present invention is to overcome or at least mitigate drawbacks of prior art video conferencing systems.

In a first aspect the invention provides a method of providing real time audio in a multi-point videoconferencing system comprising at least two videoconferencing endpoints in communication with a multipoint control unit (MCU). The method comprising capturing one or more input lossless digital audio streams on each of the at least two videoconferencing endpoints; transmitting the one or more input lossless digital audio streams from each of the at least two videoconferencing endpoints to the MCU using a frame size in the range 0.25 ms-3 ms; mixing, using the MCU, the one or more input lossless digital audio streams from each of the at least two videoconferencing endpoints into a plurality of output lossless digital audio streams; transmitting a different one of the plurality of output lossless digital audio streams to each of the at least two videoconferencing endpoints using a frame size in the range 0.25 ms3 ms; and playback the plurality of output lossless digital audio streams on each of the at least two videoconferencing endpoints.

The method provides a very short audio latency from one videoconferencing endpoint to another videoconferencing endpoint.

The method may further comprise transmitting the one or more input lossless digital audio streams and the plurality of output lossless digital audio streams further comprises using a single frame buffer.

The method may further comprise further comprising using a three-frame buffer for receiving the one or more input lossless digital audio streams from each of the at least two videoconferencing endpoints at the MCU and for receiving one of the plurality of output lossless digital audio streams at each of the at least two videoconferencing endpoints.

The method may further comprise transmitting the one or more input lossless digital audio streams from each of the at least two videoconferencing endpoints and the plurality of output lossless digital audio streams further comprises transmitting a bit rate of 200 kbps-1 Mbps.

The method may further comprise transmitting the one or more input lossless digital audio streams and the plurality of output lossless digital audio streams using Pulse-Code Modulation (PCM).

The method may further comprise transmitting the one or more input lossless digital audio streams and the plurality of output lossless digital audio streams using Real-time Transport Protocol (RTP).

The method may further comprise compressing the one or more input lossless digital audio streams and the plurality of output lossless digital audio streams prior to transmission. In one embodiment, compressing the one or more input lossless digital audio streams and the plurality of output lossless digital audio streams prior to transmission, may comprise applying Huffmann encoding on the plurality of input lossless digital audio streams and the plurality of output lossless digital audio streams.

In one embodiment, the step of capturing the one or more input lossless digital audio streams on each of the at least two videoconferencing endpoints may further comprise bypassing any echo cancellation algorithm of the at least two videoconferencing endpoints.

In a second aspect, the invention provides a real time audio multi-point videoconferencing system comprising at least two videoconferencing endpoints in communication with a multipoint control unit (MCU). Each of the at least two videoconferencing devices comprises an audio capturing unit adapted to capture and encode audio into one or more input lossless digital audio streams; a transmitting unit adapted to transmit the one or more input lossless digital audio streams using a frame size in the range 0.25 ms-3 ms; a receive unit adapted to receive an output lossless digital audio stream transmitted with a frame size in the range 0.25 ms-3 ms; and a playback unit adapted to playback the received output lossless digital audio stream. The MCU comprises a receive unit adapted to receive one or more input lossless digital audio streams from each of the at least two video conferencing devices, transmitted with a frame size in the range 0.25 ms-3 ms; a mixing unit adapted to mix the one or more input lossless digital audio streams from each of the at least two video conferencing devices into a plurality of output lossless digital audio streams; and a transmitting unit adapted to transmitting a different one of the plurality of output lossless digital audio streams to each of the at least two videoconferencing endpoints using a frame size in the range 0.25 ms-3 ms.

The transmitting unit of each of the at least two videoconferencing endpoints and the transmitting unit of the MCU may be adapted to transmit the respective input and output lossless digital audio streams using a single frame buffer.

The receive unit of each of the at least two videoconferencing endpoints and the receive unit of the MCU may be adapted to receive the respective output and input lossless digital audio streams using a three-frame buffer.

The transmitting unit of each of the at least two videoconferencing endpoints and the transmitting unit of the MCU may be adapted to transmit the respective input and output lossless digital audio stream using a bit rate of 200 kbps-1 Mbps.

The transmitting unit of each of the at least two videoconferencing endpoints and the transmitting unit of the MCU may be adapted to transmit the respective input and output lossless digital audio stream using Pulse-Code Modulation (PCM).

The transmitting unit of each of the at least two videoconferencing endpoints and the transmitting unit of the MCU may be adapted to transmit the respective input and output lossless digital audio stream using Real-time Transport Protocol (RTP).

The audio capturing unit may be adapted to compress the input lossless digital audio stream. In one embodiment, the audio capturing unit may be adapted to compress the input lossless digital audio stream by applying Huffmann encoding.

The audio capturing unit may be adapted to bypass any echo cancellation algorithm of the videoconferencing endpoint.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

According to embodiments of the present invention as disclosed herein, the above-mentioned disadvantages of solutions according to prior art are eliminated or at least mitigated.

Figure 2:
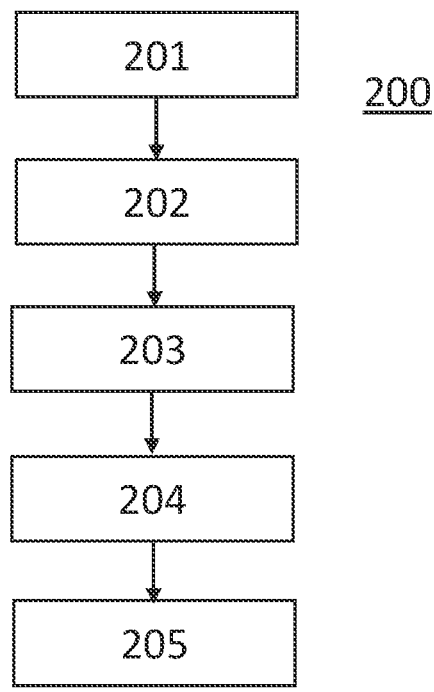
FIG. 2 is a flowchart illustrating an exemplary method of providing real time audio in a multi-point videoconferencing system.

FIG. 2 is a schematic illustration of an exemplary method 200 of providing real time audio in a multi-point videoconferencing system 100, comprising at least two videoconferencing endpoints 101a, 101b, 101c in communication with a multipoint control unit (MCU) 104. An MCU in this context, may refer to all units, both in terms of a device and a software based virtual node, being both distributed or assembled, that are bridging and/or mixing media data from and to endpoints or terminals in a video conference. An endpoint in this context, may refer to both hardware and software video conferencing terminals, including (but not limited to) conventional video conferencing meeting room systems, desktop video conferencing terminals, video conferencing apps for PC and mobile phones, and browser-based video conferencing terminals. The first step 201 comprises capturing one or more input lossless digital audio streams 102a, 102b, 102c on each of the at least two videoconferencing endpoints 101a, 101b, 101c. The input lossless digital audio streams 102a, 102b, 102c may be raw audio from an audio capture device, e.g. a microphone. The input lossless digital audio streams 102a, 102b, 102c may be uncompressed audio, or the videoconferencing endpoints 101a, 101b, 101c may compress the one or more input lossless digital audio streams 102a, 102b, 102c prior to transmission using a lossless compression algorithm. In one exemplary embodiment the compression comprises applying Huffmann encoding on the input lossless digital audio streams 102a, 102b, 102c.

The next step 202 comprises transmitting the one or more input lossless digital audio streams 102a, 102b, 102c from each of the at least two videoconferencing endpoints 101a, 101b, 101c to the MCU 104 using a frame size in the range 0.25 ms-3 ms. In one embodiment, the step of transmitting the one or more input lossless digital audio streams 102a, 102*b*, 102*c* further comprises using a single frame buffer. In one exemplary embodiment, where the frame size is 1ms, this limits the latency on the transmit side to 1 ms.

The next step 203 comprises mixing, using the MCU 104, the one or more input lossless digital audio streams 102*a*, 102*b*, 102*c* from each of the at least two videoconferencing endpoints 101*a*, 101*b*, 101*c* into a plurality of output lossless digital audio streams 103*a*, 103*b*, 103*c*. The MCU 104 mix the input lossless digital audio streams 102*a*, 102*b*, 102*c* using the frame size of lossless digital audio streams 102*a*, 102*b*, 102*c*. E.g. if the frame size is 1 ms, the MCU mix the plurality of output lossless digital audio streams 103*a*, 103*b*, 103*c* once every 1 ms. In one embodiment, the MCU 104 is using a three-frame buffer for receiving the one or more input lossless digital audio streams 102*a*, 102*b*, 102*c* from each of the at least two videoconferencing endpoints 101*a*, 101*b*, 101*c*. The tree-frame buffer is one embodiment a combined jitter/mixer buffer. When the frame size is 1 ms tree-frame buffer limits the input latency to 3 ms.

Figure 1:
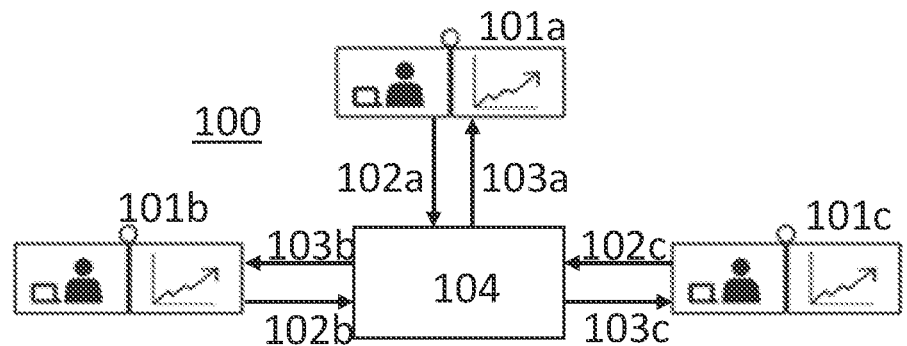
FIG. 1 is a schematic illustration of a multi-point videoconferencing system.

The input lossless digital audio streams 102*a*, 102*b*, 102*c* are generally mixed such that a videoconferencing endpoint transmitting an input audio stream does not receive that audio in the output stream. In the exemplary multi-point video-conferencing system of FIG. 1, the MCU 104 would typically mix input lossless digital audio streams 102*a*, 102*b* in the output lossless digital audio streams 103*c*, input lossless digital audio streams 102*a*, 102*c* in the output lossless digital audio streams 103*b* and input lossless digital audio streams 102*b*, 102*c* in the output lossless digital audio streams 103*a*.

The next step 204 comprises transmitting a different one of the plurality of output lossless digital audio streams 103*a*, 103*b*, 103*c* to each of the at least two video-conferencing endpoints 101*a*, 101*b*, 101*c* using a frame size in the range 0.25 ms-3 ms. In one embodiment, the step of transmitting the plurality of output lossless digital audio streams 103*a*, 103*b*, 103*c* further comprises using a single frame buffer. In one exemplary embodiment, where the frame size is 1ms, this limits the latency on the transmit side to 1 ms.

The output lossless digital audio streams 103*a*, 103*b*, 103*c* may be uncompressed audio, or the MCU 104 may compress the plurality of output lossless digital audio streams 103*a*, 103*b*, 103*c* prior to transmission using a lossless compression algorithm. In one exemplary embodiment the compression comprises applying Huffmann encoding on the output lossless digital audio streams 103*a*, 103*b*, 103*c*.

The next step 205 comprises playback the plurality of output lossless digital audio streams 103*a*, 103*b*, 103*c* on each of the at least two videoconferencing endpoints 101*a*, 101*b*, 101*c*. Each of the at least two videoconferencing endpoints 101*a*, 101*b*, 101*c* playback one of the output lossless digital audio streams 103*a*, 103*b*, 103*c* using the frame size of the output lossless digital audio streams 103*a*, 103*b*, 103*c*. E.g. if the frame size is 1 ms, the videoconferencing endpoints 101*a*, 101*b*, 101*c* playback the output lossless digital audio streams 103*a*, 103*b*, 103*c* once every 1 ms. In one embodiment the videoconferencing endpoints 101*a*, 101*b*, 101*c* is using a three-frame buffer for receiving one of the plurality of output lossless digital audio streams 103*a*, 103*b*, 103*c*. When the frame size is 1 ms tree-frame buffer limits the input latency to 3 ms.

The step 202 of transmitting the one or more input lossless digital audio streams 102*a*, 102*b*, 102*c* and the step 204 of transmitting plurality of output lossless digital audio streams 103*a*, 103*b*, 103*c* further comprises transmitting at a bit rate of 200 kbps-1 Mbps.

The step 202 of transmitting the one or more input lossless digital audio streams 102*a*, 102*b*, 102*c* and the step 204 of transmitting plurality of output lossless digital audio streams 103*a*, 103*b*, 103*c* may in one embodiment comprise transmitting using Pulse-Code Modulation (PCM).

The step 202 of transmitting the one or more input lossless digital audio streams 102*a*, 102*b*, 102*c* and the step 204 of transmitting plurality of output lossless digital audio streams 103*a*, 103*b*, 103*c* may in one embodiment comprise transmitting using Real-time Transport Protocol (RTP).

RFC 2586, RFC 4856 and RFC 3190 are exemplary standards describing transmitting PCM over RTP. L16 audio sampled at 48 KHz transmitted over RTP requires less than 1 Mbps bandwidth. The inventors of the present invention realized that modern networks easily manage such bandwidth requirements. This allows for bypassing the lossy compression codecs used in present multi-point video-conferencing systems. Not only does this allow for higher quality audio, it also allows for very low latency as disclosed in claimed method.

In one embodiment, the MCU 104 mix the one or more input lossless digital audio streams using the sampling rate used for capturing the one or more input lossless digital audio streams, e.g. 48 KHz, saving resampling time and further reducing latency.

In order to avoid the use of echo cancellation algorithms that adds significant latency, musicians playing together in a multi-point videoconferencing system may chose to playback the output lossless digital audio streams 103*a*, 103*b*, 103*c* in headphones. However, due to the very low latency of present method the output lossless digital audio streams 103*a*, 103*b*, 103*c* is perceived as instantaneous with the input lossless digital audio streams 102*a*, 102*b*, 102*c*, and echo cancellation algorithms may be avoided altogether. The musicians may instead use speakers-/monitors for playback and the system may adjust gain and other equalizer settings to avoid "howling".

The inventors have realized that because of the very low latency of the present method, the need for echo cancellation is limited, and by bypassing any echo cancellation algorithms on the at least two videoconferencing endpoints when capturing the one or more input lossless digital audio streams, the latency becomes even lower, and echo cancellation becomes even less needed.

The described method may require considerable processing resources at both the transmitting endpoint, the receiving endpoint and the MCU. It also may require more bandwidth than the receiver and transmitting side are able to provide. It may therefore be necessary to manually set the system in a low-latency mode.

Figure 3:
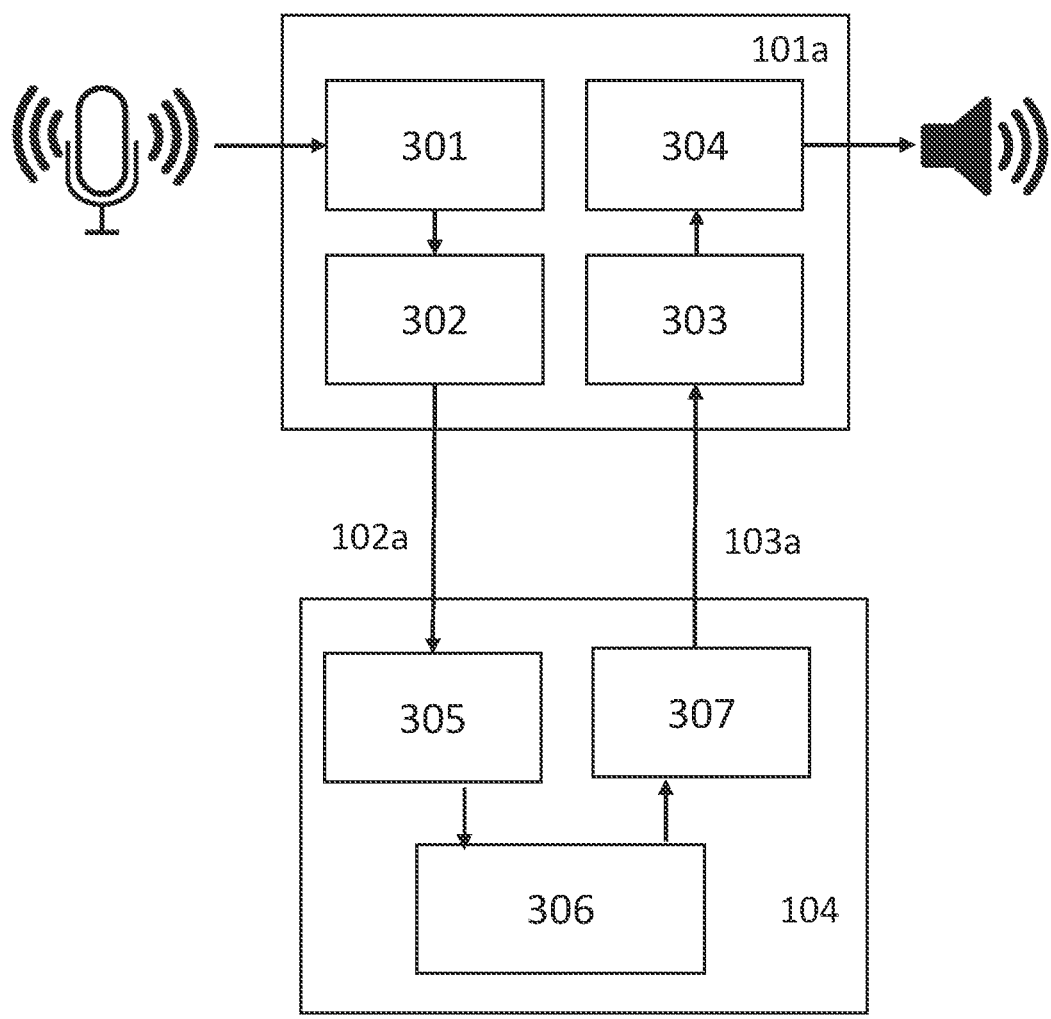
FIG. 3 is a schematic illustration of an exemplary videoconferencing endpoint and a multi-point control unit.

FIG. 3 is a schematic illustration of one of at least two videoconferencing endpoints 101*a*, 101*b*, 101*c* in communication with the MCU 104. Each of the video-conferencing endpoints 101*a*, 101*b*, 101*c* comprises an audio capturing unit 301 adapted to capture and encode audio into the one or more input lossless digital audio streams 102*a*, 102*b*, 102*c*, a transmitting unit 302 adapted to transmit the one or more input lossless digital audio streams 102*a*, 102*b*, 102*c* using a frame size in the range 0.25 ms-3 ms, a receive unit 303 adapted to receive the output lossless digital audio stream 103*a*, 103*b*, 103*c* transmitted with a frame size in the range 0.25 ms-3 ms, and a playback unit 304 adapted to playback the received output lossless digital audio stream 103*a*, 103*b*, 103*c*.

The MCU 104 comprises a receive unit 305 adapted to receive the one or more input lossless digital audio streams 102*a*, 102*b*, 102*c* from each of the at least two video conferencing devices 101*a*, 101*b*, 101*c*, transmitted with a frame size in the range 0.25 ms-3 ms, a mixing unit 306 adapted to mix the one or more input lossless digital audio streams 102*a*, 102*b*, 102*c* from each of the at least two video conferencing devices 101*a*, 101*b*, 101*c* into a plurality of output lossless digital audio streams 103*a*, 103*b*, 103*c*, and a transmitting unit 307 adapted to transmitting a different one of the plurality of output lossless digital audio streams 103*a*, 103*b*, 103*c* to each of the at least two videoconferencing endpoints using 101*a*, 101*b*, 101*c* a frame size in the range 0.25 ms-3 ms.

In one embodiment, the transmitting unit 302 of each of the at least two video-conferencing endpoints 101*a*, 101*b*, 101*c* and the transmitting unit 307 of the MCU 104 is adapted to transmit the respective input and output lossless digital audio streams using a single frame buffer.

In one embodiment the receive unit 303 of each of the at least two video-conferencing endpoints 101*a*, 101*b*, 101*c* and the receiving unit 305 of the MCU is adapted to receive the respective output and input lossless digital audio stream using a three-frame buffer.

In one embodiment the transmitting unit 302 of each of the at least two video-conferencing endpoints 101*a*, 101*b*, 101*c* and the transmitting unit 307 of the MCU is adapted to transmit the respective input and output lossless digital audio stream using a bit rate of 200 kbps-1 Mbps.

In one embodiment the transmitting unit 302 of each of the at least two video-conferencing endpoints 101*a*, 101*b*, 101*c* and the transmitting unit 307 of the MCU is adapted to transmit the respective input and output lossless digital audio stream using Pulse-Code Modulation (PCM).

In one embodiment the transmitting unit 302 of each of the at least two video-conferencing endpoints 101*a*, 101*b*, 101*c* and the transmitting unit 307 of the MCU is adapted to transmit the respective input and output lossless digital audio stream using Real-time Transport Protocol (RTP).

In one embodiment the audio capturing unit 301 is adapted to compress the input lossless digital audio stream.

In one embodiment the audio capturing unit 301 is adapted to compress the input lossless digital audio stream by applying Huffmann encoding.

In one embodiment the audio capturing unit 301 is adapted to bypass any echo cancellation algorithm of the at videoconferencing endpoint 101*a*, 101*b*, 101*c*.

In the preceding description, various aspects of the method and imaging processing device according to the invention have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the method and image processing device, which are apparent to persons skilled in the art to which the disclosed subject matter pertains, are deemed to lie within the scope of the present invention.

What is claimed is:

1. A method of providing real time audio in a multi-point videoconferencing system having at least two videoconferencing endpoints in communication with a multipoint control unit (MCU), the method comprising:
   capturing one or more input lossless digital audio streams on each of the at least two videoconferencing endpoints;
   transmitting the one or more input lossless digital audio streams from each of the at least two videoconferencing endpoints to the MCU using a frame size in the range 0.25 ms-3 ms;
   mixing, using the MCU, the one or more input lossless digital audio streams from each of the at least two videoconferencing endpoints into a plurality of output lossless digital audio streams;
   transmitting a different one of the plurality of output lossless digital audio streams to each of the at least two videoconferencing endpoints using a frame size in the range 0.25 ms-3 ms;
   playing back the plurality of output lossless digital audio streams on each of the at least two videoconferencing endpoints; and
   compressing the one or more input lossless digital audio streams and the plurality of output lossless digital audio streams prior to transmission.

2. The method of claim 1, wherein the step of transmitting the one or more input lossless digital audio streams and the plurality of output lossless digital audio streams further comprises using a single frame buffer.

3. The method of claim 1, further comprising using a three-frame buffer for receiving the one or more input lossless digital audio streams from each of the at least two videoconferencing endpoints at the MCU and for receiving one of the plurality of output lossless digital audio streams at each of the at least two videoconferencing endpoints.

4. The method of claim 1, wherein the step of transmitting the one or more input lossless digital audio streams from each of the at least two videoconferencing endpoints and the plurality of output lossless digital audio streams further comprises transmitting a bit rate of 200 kbps-1 Mbps.

5. The method of claim 1, further comprising transmitting the one or more input lossless digital audio streams and the plurality of output lossless digital audio streams using Pulse-Code Modulation (PCM).

6. The method of claim 1, further comprising transmitting the one or more input lossless digital audio streams and the plurality of output lossless digital audio streams using Real-time Transport Protocol (RTP).

7. The method of claim 1, wherein the step of compressing the one or more input lossless digital audio streams and the plurality of output lossless digital audio streams prior to transmission, comprises applying Huffmann encoding on the plurality of input lossless digital audio streams and the plurality of output lossless digital audio streams.

8. The method of claim 1, wherein the step of capturing the one or more input lossless digital audio streams on each of the at least two videoconferencing endpoints further comprises bypassing any echo cancellation algorithm of the at least two videoconferencing endpoints.

9. A real time audio multi-point videoconferencing system having at least two videoconferencing endpoints in communication with a multipoint control unit (MCU), wherein
   each of the at least two videoconferencing devices comprises:
   an audio capturing unit adapted to capture and encode audio into one or more input lossless digital audio streams, and to compress the input lossless digital audio streams;
   a transmitting unit adapted to transmit the one or more input lossless digital audio streams using a frame size in the range 0.25 ms-3 ms;
   a receive unit adapted to receive an output lossless digital audio stream transmitted with a frame size in the range 0.25 ms-3 ms; and a playback unit adapted to playback the received output lossless digital audio stream; and the MCU comprises a receive unit adapted to receive one or more input lossless digital audio streams from each of the at least two video conferencing devices, transmitted with a frame size in the range 0.25 ms-3 ms;

a mixing unit adapted to mix the one or more input lossless digital audio streams from each of the at least two video conferencing devices into a plurality of output lossless digital audio streams; and a transmitting unit adapted to transmitting a different one of the plurality of output lossless digital audio streams to each of the at least two videoconferencing endpoints using a frame size in the range 0.25 ms-3 ms.

10. The system of claim 9, wherein the transmitting unit of each of the at least two videoconferencing endpoints and the transmitting unit of the MCU is adapted to transmit the respective input and output lossless digital audio streams using a single frame buffer.

11. The system of claim 9, wherein the receive unit of each of the at least two videoconferencing endpoints and the transmitting unit of the MCU is adapted to receive the respective output and input lossless digital audio streams using a three-frame buffer.

12. The system of claim 9, wherein the transmitting unit of each of the at least two videoconferencing endpoints and the transmitting unit of the MCU is adapted to transmit the respective input and output lossless digital audio stream using a bit rate of 200 kbps-1 Mbps.

13. The system of claim 9, wherein the transmitting unit of each of the at least two videoconferencing endpoints and the transmitting unit of the MCU is adapted to transmit the respective input and output lossless digital audio stream using Pulse-Code Modulation (PCM).

14. The system of claim 9, wherein the transmitting unit of each of the at least two videoconferencing endpoints and the transmitting unit of the MCU is adapted to transmit the respective input and output lossless digital audio stream using Real-time Transport Protocol (RTP).

15. The system of claim 9, wherein the audio capturing unit is adapted to compress the input lossless digital audio stream by applying Huffmann encoding.

16. The system of claim 9, wherein the audio capturing unit is adapted to bypass any echo cancellation algorithm of the videoconferencing endpoint.

* * * * *